US006965922B1

(12) United States Patent
Holland et al.

(10) Patent No.: US 6,965,922 B1
(45) Date of Patent: Nov. 15, 2005

(54) COMPUTER SYSTEM AND METHOD WITH INTERNAL USE OF NETWORKING SWITCHING

(75) Inventors: William Gavin Holland, Cary, NC (US); Francis Edward Noel, Jr., Durham, NC (US); Charles Joseph Sannipoli, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/551,790

(22) Filed: Apr. 18, 2000

(51) Int. Cl.[7] .......................................... G06F 13/00
(52) U.S. Cl. ..................................... 709/213; 709/238
(58) Field of Search ................................ 709/238, 213

(56) References Cited

U.S. PATENT DOCUMENTS

| | | | |
|---|---|---|---|
| 5,008,878 A | 4/1991 | Ahmadi et al. ............... 370/60 |
| 5,179,669 A | 1/1993 | Peters ......................... 395/325 |
| 5,179,715 A | 1/1993 | Andoh et al. ............... 395/800 |
| 5,517,662 A | 5/1996 | Coleman et al. ............ 395/800 |
| 5,598,568 A | 1/1997 | Frisch ......................... 395/800 |
| 5,619,650 A | 4/1997 | Bach et al. ............. 395/200.01 |
| 5,751,934 A | 5/1998 | Han et al. ............... 345/182.02 |
| 5,774,698 A | 6/1998 | Olnowich .................... 395/500 |
| 5,835,971 A | 11/1998 | Ikeda ........................... 711/220 |
| 5,842,034 A | 11/1998 | Bolstad et al. ......... 395/800.11 |
| 5,890,007 A | 3/1999 | Zinguuzi ................ 395/800.06 |
| 6,460,120 B1 * | 10/2002 | Bass et al. ................... 711/148 |
| 6,487,606 B1 * | 11/2002 | Minyard et al. ............. 709/251 |

FOREIGN PATENT DOCUMENTS

JP           9062641          3/1997        ........... H04L 12/40

OTHER PUBLICATIONS

IBM Technical Disclosure Bulletin, V 35, No. 1B, Jun. 1992 "Computer Memory Organization Using Fast Nonvolatile Storage" pp 380-382.
IBM Technical Disclosure Bulletin, V. 33, No. 10A, Mar. 1991 "Four Address Virtual Memory" pp 234-237.
IBM Technical Disclosure Bulletin, V. 33, No. 10A, Mar. 1991 "Parallel Long Move Instruction" pp 21-22.

* cited by examiner

*Primary Examiner*—Jack Lane
(74) *Attorney, Agent, or Firm*—Winstead Sechrest & Minick P.C.; Josh G. Cockburn

(57) ABSTRACT

A computer system in which a network processor disposed between a central processing unit and supporting peripheral subsystems and among the peripheral subsystems handles addressing of memory space.

4 Claims, 4 Drawing Sheets

COMPUTER SYSTEM AND METHOD WITH INTERNAL USE OF NETWORKING SWITCHING

RELATED APPLICATIONS

The interested reader is referred, for assistance in understanding the inventions here described, to the following prior disclosures which are relevant to the description which follows and each of which is hereby incorporated by reference into this description as fully as if here repeated in full:

U.S. Pat. No. 5,008,878 issued 16 Apr. 1991 for High Speed Modular Switching Apparatus for Circuit and Packet Switched Traffic;

U.S. Pat. No. 5,724,348 issued 3 Mar. 1998 for Efficient Hardware/Software Interface for a Data Switch;

U.S. patent application Ser. No. 09/330,968 filed 11 Jun. 1999 and entitled "High Speed Parallel/Serial Link for Data Communication";

U.S. patent application Ser. No. 09/384,689 filed 27 Aug. 1999 and entitled "VLSI Network Processor and Methods";

U.S. patent application Ser. No. 09/384,691 filed 27 Aug. 1999 and entitled "Network Processor Processing Complex and Methods";

U.S. patent application Ser. No. 09/384,692 filed 27 Aug. 1999 and entitled "Network Switch and Components and Method of Operation"; and U.S. patent application Ser. No. 09/384,744 filed 27 Aug. 1999 and entitled "Network Processor, Memory Organization and Methods".

BACKGROUND OF THE INVENTION

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than those that existed just a few years ago.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate simultaneously over a network with a software application running on a single computer system.

The description which follows presupposes knowledge of network data communications and switches and routers as used in such communications networks. In particular, the description presupposes familiarity with the OSI model of network architecture which divides network operation into layers. A typical architecture based upon the OSI model extends from Layer 1 (also sometime identified as "L1") being the physical pathway or media through which signals are passed upwards through Layers 2, 3, 4 and so forth to Layer 7, the last mentioned being the layer of applications programming running on a computer system linked to the network. In this document, mention of L1, L2 and so forth is intended to refer to the corresponding layer of a network architecture. The disclosure also presupposes a fundamental understanding of bit strings known as packets and frames in such network communication.

One of the ways in which enhanced performance of computer systems has been sought, as is well known to users of personal computer systems, is to increase the operating speed or basic clock rate of a microprocessor used as a system central processing unit or CPU. As the operating speed of CPUs has increased dramatically, data flow rates have come to exceed the access speed capabilities of main memory in such systems. At the same time, the quantity of memory accessed by the CPU has exploded. Such memory is typically present in both volatile and non-volatile forms, and the available memory storage of both types has greatly increased in recent times. This accentuates one of the main difficulties in computer systems, namely the mapping of "virtual memory addresses" as used by application software running on the CPU and "physical memory addresses" as used to access the appropriate memory element or controller and the specific location within the address space of such a device, either volatile, non-volatile or both. Memory elements and controllers, as here mentioned, are peripheral devices which support the functionality of the CPU.

Current computer system implementations provide as peripherals one or more memory controllers configured to present memory as a single, contiguous, physical address range along with a number of input/output or I/O controllers each assigned a unique address (or small range of addresses) outside the system memory space. An operating system (of which there are a large number including without limitation the various Windows products of Microsoft, OS/2, Linux and others) typically provides a much larger contiguous virtual memory space for the benefit of applications running on the system. When a system is first started up, much of the virtual memory space maps directly to physical memory. As demand for memory space increases and as application programs make varying demands for memory access, the operating system will "page out" idle memory blocks, through a storage I/O subsystem, to storage on a direct access storage device (DASD), commonly known as a hard disk, drive or file. As memory spaces are created, paged in, paged out, and eventually freed up, the mapping of virtual memory to physical memory becomes almost completely random within the memory available. Application software knows only virtual addresses, and each memory access issued must somehow present the appropriate physical address of the desired memory location to the memory controller or, if necessary, a page may need to be located on disk and paged in prior to accessing it in main memory. The process of mapping virtual addresses to physical addresses, also known as virtual address translation, contributes a significant performance robbing overhead to the overall operation of a computer system.

SUMMARY OF THE INVENTION

The present invention contemplates providing hardware to implement the key functions of memory management so as to dramatically improve the performance of a computer system in which the present invention is implemented. In pursuing this purpose, these functions can include the creation, release and management of memory address spaces for applications; virtual to physical address translation; mapping memory addresses to disk storage for page-in and page-out operations; autonomous execution of paging functions; and memory optimization through caching, pipelining, paging and other memory access methods.

The hardware employed inserts into an otherwise conventional computer system, which may function as a server or client system (as those terms are understood in computer network applications), a form of switching more conventionally found heretofore at the network level where computer systems are interconnected one with another. Thus the present invention applies internally within a computer system certain technology recently proposed for use externally of such systems.

BRIEF DESCRIPTION OF THE DRAWINGS

Some of the purposes of the invention having been stated, others will appear as the description proceeds, when taken in connection with the accompanying drawings, in which.

DESCRIPTION OF THE PREFERRED EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
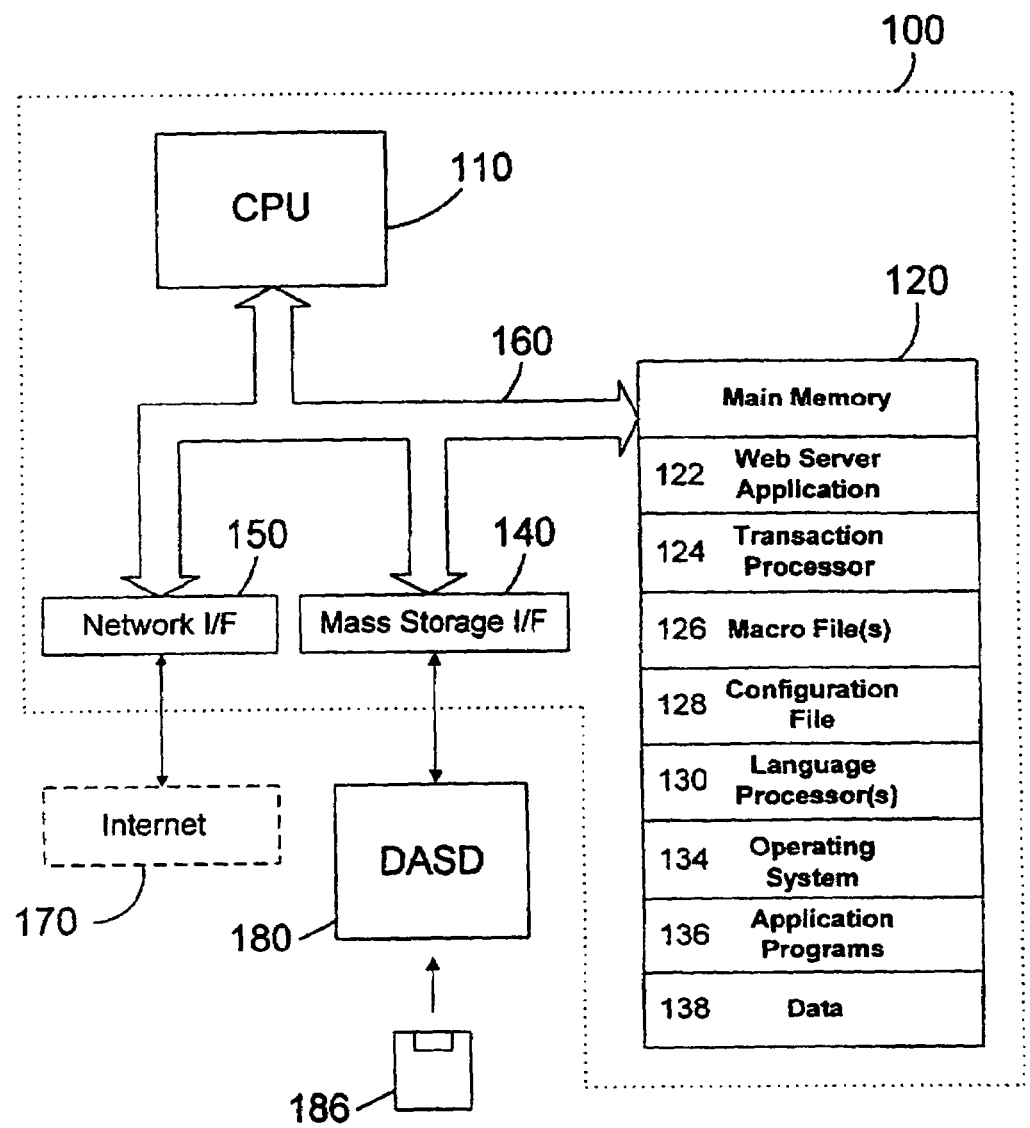
FIG. 1 is a representation of a computer system in which the present invention may be implemented.

Referring to FIG. 1, a computer system 100 in accordance with the present invention includes a central processing unit (CPU) 110, a main memory 120, a mass storage interface 140, and a network interface 150, all connected by a system bus 160. Those skilled in the art will appreciate that this system encompasses all types of computer systems: personal computers, midrange computers, mainframes, etc. Note that many additions, modifications, and deletions can be made to this computer system 100 within the scope of the invention. Examples of this are a computer monitor, input keyboard, cache memory, and peripheral devices such as printers. The present invention may operate as a web server, which is generally implemented with a personal or midrange computer.

CPU 110 can be constructed from one or more microprocessors and/or integrated circuits. CPU 110 executes program instructions stored in main memory 120. Main memory 120 stores programs and data that the computer may access. When computer system 100 starts up, CPU 110 initially executes the operating system 134 program instructions. Operating system 134 is a sophisticated program that manages the resources of the computer system 100 as briefly described above. Some of these resources are the CPU 110, main memory 120, mass storage interface 140, network interface 150, and system bus 160.

As here illustrated, the main memory 120 includes a web server application 122, a transaction processor 124, one or more macro files 126, a configuration file 128, one or more language processors 130, an operating system 134, one or more application programs 136, and program data 138. The application programs 136 are executed by the CPU 110 under the control of the operating system 134. Application programs 136 can be run with program data 138 as input. Application programs 136 can also output their results as program data 138 in main memory. When the computer system 100 operates as a web server, CPU 110 executes, among other things, a web server application 122. Transaction processor 124 is a program that processes an HTML page stored in one or more macro files 126. When transaction processor 124 is initialized, it reads configuration file 128 to correlate different types of queries to different language processors 130. When a query to dynamic data is found in a page, transaction processor 124 determines from the configuration data (read from the configuration file) which language processor 130 it should call to process the query. The appropriate language processor 130 then queries a data source, such as memory or a database, to retrieve the dynamic data. Language processor 130 passes the dynamic data to transaction processor 124, which inserts the dynamic data into the HTML data for the selected page.

Mass storage interface 140 allows computer system 100 to retrieve and store data from auxiliary storage devices such as magnetic disks (hard disks, diskettes) and optical disks (CD-ROM). These mass storage devices are commonly known as Direct Access Storage Devices (DASD), and act as a permanent store of information. One suitable type of DASD is a floppy disk drive 180 that reads data from and writes data to a floppy diskette 186. The information from the DASD can be in many forms. Common forms are application programs and program data. Data retrieved through mass storage interface 140 is often placed in main memory 120 where CPU 110 can process it, using the paging in and paging out processes briefly mentioned above.

While main memory 120 and DASD device 180 are typically separate storage devices, computer system 100 uses well known virtual addressing mechanisms that allow the programs of computer system 100 to behave as if they only have access to a large, single storage entity, instead of access to multiple, smaller storage entities (e.g., main memory 120 and DASD device 185). Therefore, while certain elements are shown to reside in main memory 120, those skilled in the art will recognize that these are not necessarily all completely contained in main memory 120 at the same time. It should be noted that the term "memory" is used herein to generically refer to the entire virtual memory of computer system 100. The term "addressing" and variations on that term will often draw distinctions between virtual addressing and physical addressing, both as described hereinabove.

Network interface 150 allows computer system 100 to send and receive data to and from any network the computer system with which it may be connected. This network may be a local area network (LAN), a wide network (WAN), or more specifically the Internet 170. Suitable methods of connecting to the Internet include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol. In pursuing implementation of this invention, certain of such protocols may be adopted for internal communication with the system 100.

System bus 160 allows data to be transferred among the various components of computer system 100. Although computer system 100 is shown to contain only a single main CPU and a single system bus, those skilled in the art will appreciate that the present invention may be practiced using a computer system that has multiple CPUs and/or multiple buses.

At this point, it is important to note that while the present invention has been (and will continue to be) described in the context of a fully functional computer system, those skilled in the art will appreciate that constituents of the present invention are capable of being distributed as a program product in a variety of forms, and that the present invention applies equally regardless of the particular type of signal bearing media used to actually carry out the distribution. Examples of signal bearing media include: recordable type media such as floppy disks (e.g., 186 of FIG. 1) and CD ROM, and transmission type media such as digital and analog communications links.

In the present invention a computer system 100 may be operated as a web server. To do so, a web server application 122 is executed by CPU 110. Another application program 136 may be run simultaneously on computer system 100 assuming that operating system 134 is a multi-tasking operating system. Web servers are generally connected to the Internet 170. As has been discussed, the Internet is a well known computer network that spans the world and is shared by millions of computers. There are many web servers on the Internet. Each computer linked to the Internet has its own unique address to enable it to communicate across the network with other computers. Many different types of data can be sent along the Internet. Examples are electronic mail, program data, digitized voice data, computer graphics, and web pages. Addresses of Internet connected devices commonly are associated with data by providing portions of data within packets or frames which are known as headers. Such addressing technology may be used internally within the computer system 100 in pursuing the goals of the present invention.

Figure 2:
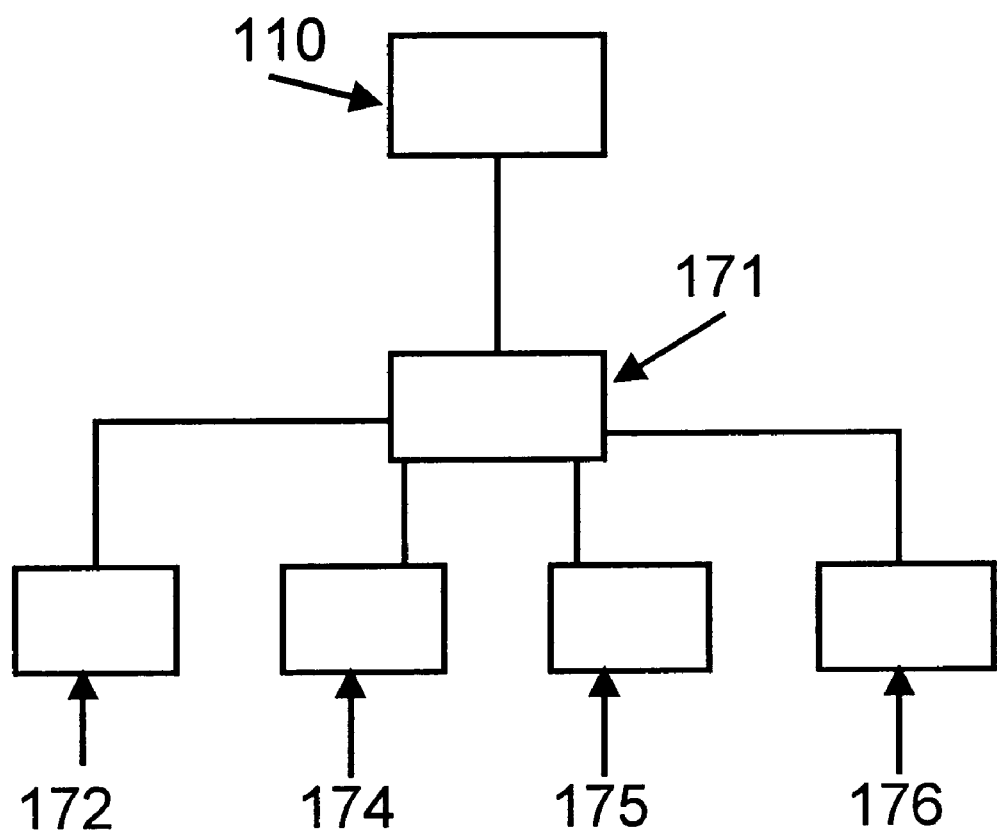
FIG. 2 is a somewhat schematic representation of a portion of the computer system of FIG. 1 further illustrating the implementation of the present invention in that environment.

In accordance with important distinguishing characteristics of this invention, a non-blocking switch fabric is provided within the computer system 100 so as to be interposed between and among the CPU 110 and those elements of the system 100 which together provide and/or directly access the system memory. The switch fabric preferably is provided by a network processor, functioning either with or without an associated secondary switch fabric. The network processor may be integrated into the computer system 100 as indicated at 171 in FIG. 2. By so implementing the incorporation of a network processor into the system, benefits are gained in terms of performance by providing dedicated, full duplex links from the processor 171 to each of the subsystems. These subsystems can include volatile memory elements 172, non-volatile memory elements 174, interface devices such as a network interface 175, and other input/output devices such as a keyboard or display 176. By placing memory address translation, data pipelining and caching within the hardware provided by the processor 171, cycles of the CPU 110 are freed to more efficiently exercise application software. By implementing these memory control functions with a hardware assist, multiple simultaneous operations can be executed in parallel, where (by way of contrast) a software implementation executes only one task at a time. The dynamic nature of memory management, with address spaces being continuously created, modified and deleted, forces each address translation to synchronize any processors executing the software implementation in order to avoid conflicts among such processors as they access memory.

The architecture used for apparatus disclosed hereinafter is based on a network processor (NP) hardware subsystem and, optionally, a software library running on a control point processor. The network processor subsystem is a high performance frame forwarding engine initially designed for parsing and translation of L2, L3, and L4+ data strings. The network processor subsystem can provide a fast-path through an apparatus while the software library and control point processor provide management and route discovery functions needed to maintain the fast-path. The control point processor and the software library running thereon together define the Control Point (CP) of the system. The control point processor may be embedded within the network processor or physically separated therefrom or absent.

Industry consultants have defined a network processor as a programmable communications integrated circuit capable of performing one or more of the following functions:

Packet classification—identifying a packet based on known characteristics, such as address or protocol;

Packet modification—modifying the packet to comply with IP, ATM, or other protocols (for example, updating the time-to-live field in the header for IP);

Queue/policy management—reflects the design strategy for packet queuing, de-queuing, and scheduling of packets for specific applications; and Packet forwarding—transmission and receipt of data over the switch fabric and forwarding or routing the packet to the appropriate address.

Although this definition is an accurate description of the basic features of early NPs, the full potential capabilities and benefits of NPs are yet to be realized. Network processors can increase the effective system bandwidth and solve latency problems in a broad range of applications by allowing networking tasks previously handled in software to be executed in hardware. In addition, NPs can provide speed improvements through architectures, such as parallel distributed processing and pipeline processing designs. These capabilities can enable efficient search engines, increase throughput, and provide rapid execution of complex tasks. This definition uses the word "packet", which is consistent with usage commonly referring to wide area networks (WANs). The inventions here described are equally functional with "frames", a term consistent with usage commonly referring to local area networks (LANs). The present invention contemplates an application of this technology within the internal workings of a single computer system.

Network processors are expected to become a fundamental network building block for networks in the same fashion that CPUs are for PCs. Typical capabilities offered by an NP are real-time processing, security, store and forward, switch fabric, and IP packet handling and learning capabilities. As here exercised, such capabilities are employed to essentially depart from the internal bus structures which have become standard within the computer industry and pass the data transfers heretofore occurring along such busses through the network processor. An NP applied in accordance with this invention provides capabilities for, as examples, address translation and inter-processor communication including broadcast which are beyond the capabilities available in more widely known internal bus structures. It is contemplated by this invention that these capabilities be exercised within a computer system in accordance with this invention.

The processor-model NP incorporates multiple general purpose processors and specialized logic. A processor-model NP allows distributed processing at lower levels of integration, providing higher throughput, flexibility and control. Programmability can enable easy migration to new protocols and technologies, without requiring new ASIC designs.

Certain portions of the apparatus described hereinafter are designed to be a modular unit using a network processor (NP) and a Control Point (CP) as its fundamental building blocks. An optional switching fabric device can be used when more than two such units are tied together. The optional switching fabric device, if used, may be as disclosed in U.S. Pat. No. 5,008,878 issued 16 Apr. 1991 for High Speed Modular Switching Apparatus for Circuit and Packet Switched Traffic mentioned hereinabove and incorporated herein by reference. Alternatively, the data align serial link (DASL) ports of a single unit (described hereinafter) may be linked Up side directly to Down side and a single unit may function as a switch of the type appropriate for certain applications of the technology here described.

Preferably and as here disclosed, the interface device contemplated by this invention (also here identified as a network processor or NP) is a unitary Very Large Scale Integrated (VLSI) circuit device or chip which has a semiconductor substrate; a plurality of interface processors formed on the substrate; internal instruction memory formed on said substrate and storing instructions accessibly to the interface processors; internal data memory formed on the substrate and storing data passing through the device accessibly to the interface processors; and a plurality of input/output ports. The interface processors are also sometimes herein identified as picoprocessors or processing units. The ports provided include at least one port connecting the internal data memory with external data memory and such number of ports as are necessary to exchange data passing through the interface device with the memory elements and peripherals of the computer system 100. The control point, if present, cooperates with the interface device by loading into the instruction memory instructions to be executed by the interface processors in directing the exchange of data between the data exchange input/output ports and the flow of data through the data memory. The CP and NP may be integrated onto a single semiconductor substrate.

The network processor here disclosed is deemed inventive apart from the assemblies into which it is incorporated. Further, the network processor here disclosed is deemed to have within its elements here described other and further inventions not here fully discussed.

Figure 3:
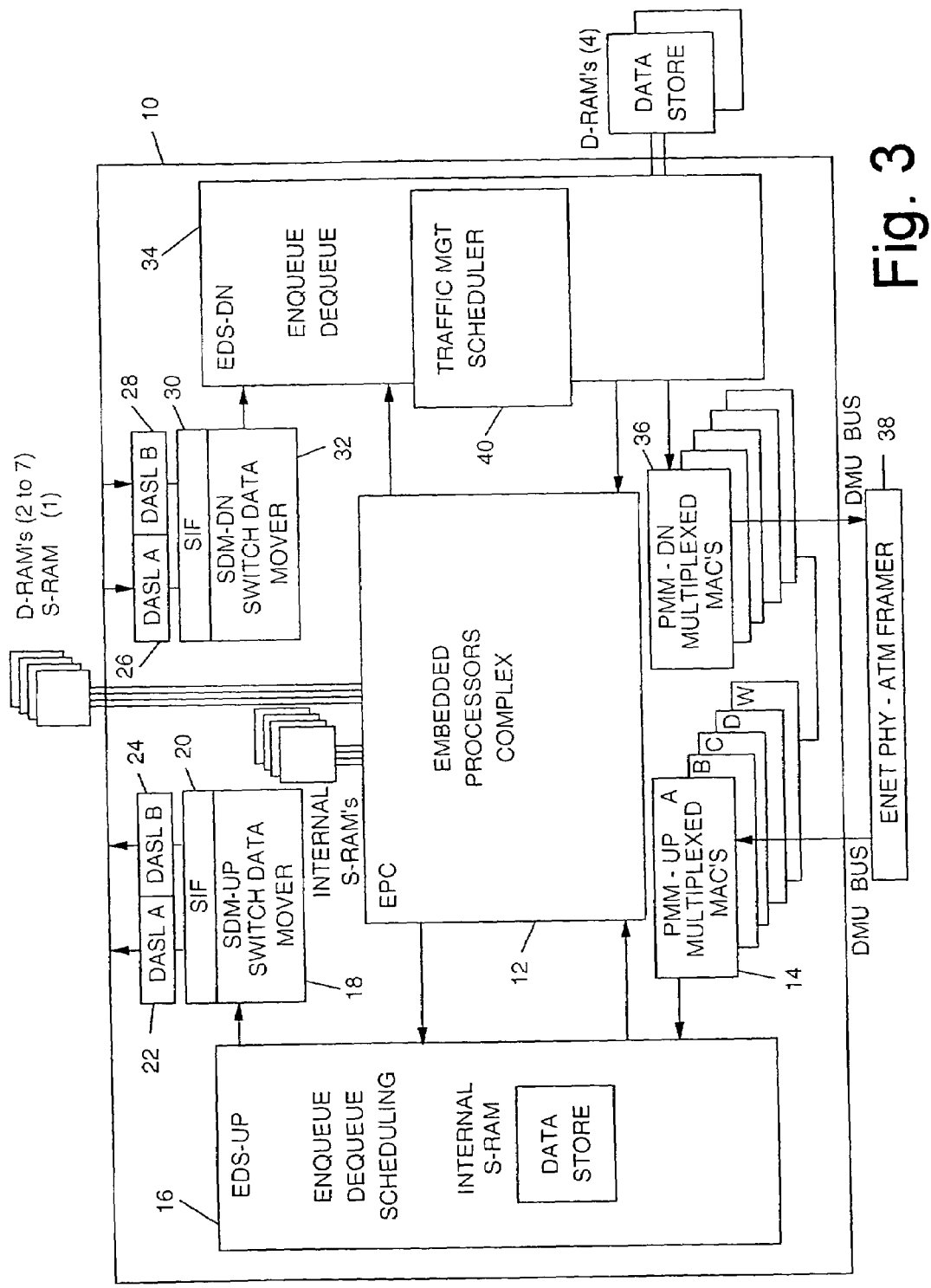
FIG. 3 is a somewhat schematic representation of a network processor as used in this invention.
Figure 4:
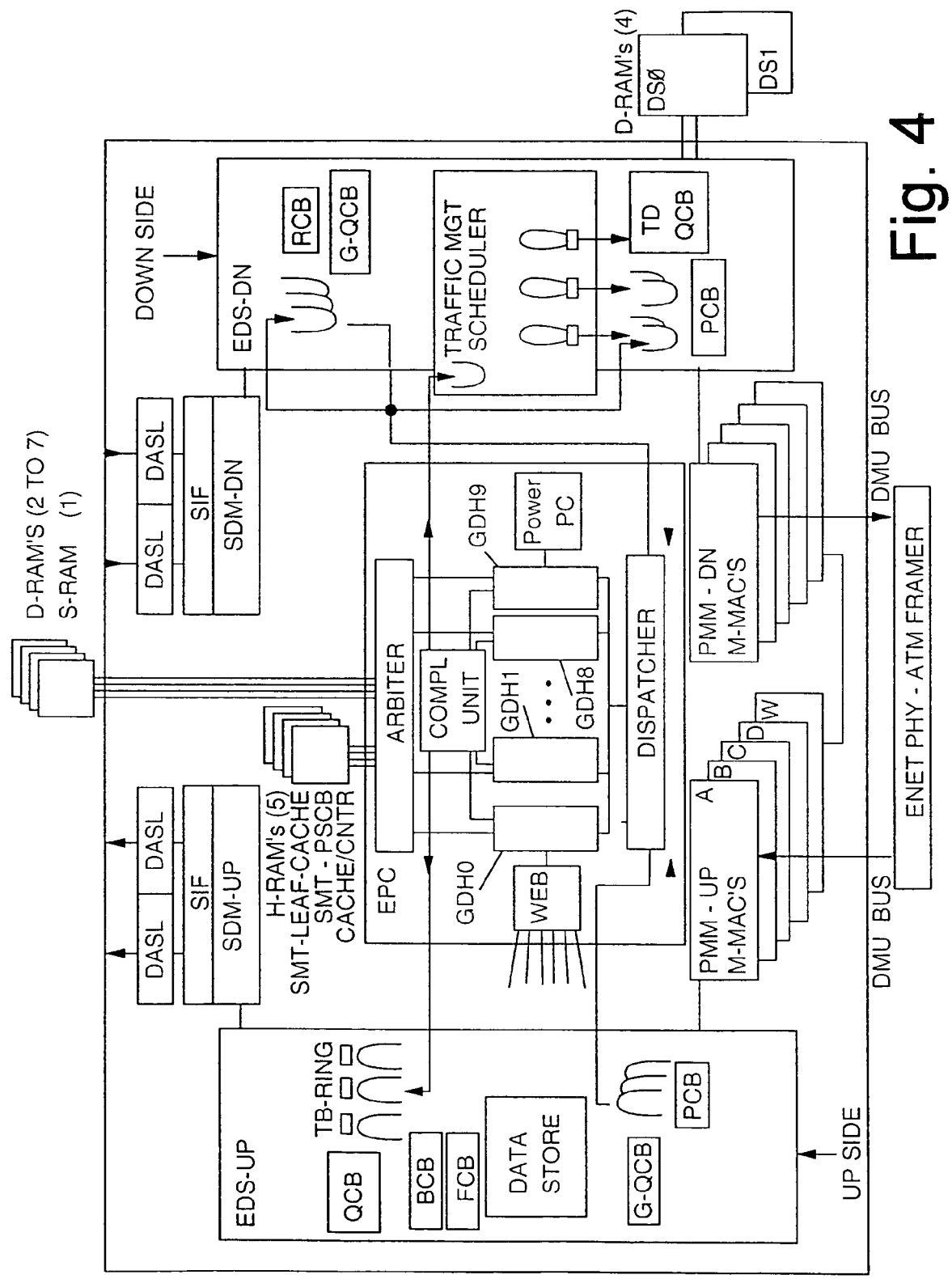
FIG. 4 is another, somewhat schematic, representation of a network processor as used in this invention.

For a more complete understanding, FIG. 3 shows a block diagram for the network processor chip that includes substrate 10 and a plurality of sub-assemblies integrated on the substrate. The sub-assemblies are arranged into an Upside configuration and a Downside configuration. As used herein, "Upside" refers to data flows inbound to the network processor here disclosed, while "Downside" refers to data flows outbound from the network processor to a device or element serviced by the network processor. The data flow follows the respective configurations. As a consequence, there is an Upside data flow and a Downside data flow. The sub-assemblies in the Upside include Enqueue-Dequeue-Scheduling UP (EDS-UP) logic 16, multiplexed I/Os-UP (PPM-UP) 14, Switch Data Mover-UP (SDM-UP) 18, System Interface (SIF) 20, Data Align Serial Link A (DASLA) 22, and Data Align Serial Link B (DASLB) 24. A data align serial link is more fully described in copending U.S. patent application Ser. No. 09/330,968 filed 11 Jun. 1999 and entitled "High Speed Parallel/Serial Link for Data Communication" incorporated by reference hereinto to any extent necessary for a full understanding of the invention here disclosed. While the preferred form of the apparatus of this invention here disclosed uses a DASL link, the present invention contemplates that other forms of links may be employed to achieve relatively high data flow rates, particularly where the data flow are restricted to being within the VLSI structure.

The sub-assemblies in the downside include DASL-A 26, DASL-B 28, SIF 30, SDM-DN 32, EDS-DN 34, and PPM-DN 36. The chip also includes a plurality of internal S-RAM's, Traffic Mgt Scheduler 40, and Embedded Processor Complex (EPC) 12. An interface device 38 is coupled by respective DMU Busses to the I/O ports 14 and 36. The interface 38 could be any suitable L1 circuitry appropriate to the internal communication within the computer system 100. The type of interface is dictated in part by the devices and elements to which the chip is connected. Desirably, a plurality of external D-RAM's and S-RAM are available for use by the chip.

The arrows show the general flow of data within the network processor. For example, data flows received from a I/O port are placed in internal Data Store buffers by the EDS-UP. These data flows are identified as either normal Data Frames or system control Guided Frames and enqueued to the EPC (FIG. 3). The EPC contains N protocol processors capable of working on up to N frames in parallel (N>1). In an embodiment with ten protocol processors, two of the ten protocol processors are specialized; one for handling Guided Frames (the Generic Central Handler or GCH) and one for building Lookup Data in Control Memory (the Generic Tree Handler or GTH). The EPC also contains a dispatcher which matches data flows with idle processors, a completion unit which maintains frame sequence, a Common Instruction memory shared by all ten processors, a Classifier Hardware Assist which determines frame classification and coprocessor which helps determine the starting instruction address of the frame, Ingress and Egress Data Store interfaces which control read and write operations of frame buffers, a Control Memory Arbiter which allows the ten processors to share Control Memory, a Web Control, Arbiter and interface that allows debug access to internal NP data structures, as well as other hardware constructs.

Guided Frames are sent by the dispatcher to the GCH processor as it becomes available. Operations encoded in the Guided Frame are executed, such as register writes, counter reads, I/O port configuration changes, and so on. Lookup table alterations, such as adding port entries, are passed on to the Lookup Data processor for Control Memory operations, such as memory reads and writes. Some commands, such as MIB counter reads, require a response frame to be built and forwarded to the appropriate port on the appropriate device. In some cases, the Guided Frame is encoded for the Egress side of an interface device. These frames are forwarded to the Egress side of the interface device being queried, which then executes the encoded operations and builds any appropriate response frame.

Data frames are dispatched to the next available protocol processor for performing frame lookups. Frame data are passed to the protocol processor along with results from the Classifier Hardware Assist (CHA) Engine. The results determine the Tree Search algorithm and starting Common Instruction Address (CIA). Tree Search algorithms supported can include Fixed Match Trees (fixed size patterns requiring exact match, such as Layer 2 MAC tables), Longest prefix Match Trees (variable length patterns requiring variable length matches, such as subnet IP forwarding) and Software Managed Trees (two patterns defining either a range or a bit mask set, such as used for filter rules).

Lookup is performed with the aid of the Tree Search Engine (TSE) Coprocessor, which is a part of each protocol processor. The TSE Coprocessor performs Control memory accesses, freeing the protocol processor to continue execution. Control memory stores all tables, counters, and other data needed by the picocode. Control memory operations are managed by the Control memory Arbiter, which arbitrates memory access among the ten processor complexes.

Frame data are accessed through the Data Store Coprocessor. The Data Store Coprocessor contains a primary data buffer (holding up to eight 16 byte segments of frame data), a scratch pad data buffer (also holding up to eight 16-byte segments of frame data) and some control registers for Data Store operations. Once a match is found, Ingress frame alterations may include a VLAN header insertion or overlay. This alteration is not performed by the interface device processor complex, but rather hardware flags are derived and other Ingress Switch interface hardware performs the alterations. Other frame alterations can be accomplished by the picocode and the Data Store Coprocessor by modifying the frame contents held in the Ingress Data Store.

Egress Tree Searches support the same algorithms as supported for Ingress Searches. Lookup is performed with the TSE Coprocessor, freeing the protocol processor to continue execution. All Control memory operations are managed by the Control memory Arbiter, which allocates memory access among the ten processor complexes.

Egress frame data are accessed through the Data Store Coprocessor. The Data Store Coprocessor contains a primary data buffer (holding up to eight 16-byte segments of frame data), a scratch pad data buffer (also holding up to eight 16-byte segments of frame data) and some control registers for Data Store operations. The result of a successful lookup contains forwarding information and, in some cases, frame alteration information. Frame alterations can include header deletion, Header Checksum recalculation, CRC overlay or insertion and DA/SA overlay or insertion. Header checksums are prepared by the Checksum Coprocessor. Alterations are not performed by the Interface device Processor Complex, but rather hardware flags are created and PMM Egress hardware performs the alterations. Upon completion, the Enqueue Coprocessor is used to help build the necessary formats for enqueuing the frame in the EDS Egress queues and sending them to the Completion Unit. The Completion Unit guarantees frame order from the ten protocol processors to the EDS Egress queues feeding the egress I/O ports.

The completed frames are finally sent out the ports by PMM Egress hardware.

In prior computer systems generally similar to the system 100 implementing this invention, cache management is normally a hardware function within a memory controller. Such an implementation is generally unable to account for the varying application programs which may seek to "own" various memory segments. In the implementation of this invention, the ownership of memory spaces is more intelligently managed, along with caching of memory contents, so that a more intelligent set of fill cache, don't cache, purge cache decisions can be made as applications become more active or pause activity, and as memory spaces page-in and page-out. An NP is able to maintain an affinity between memory spaces and applications, which allows linkage to various attributes such as priority and security. As a result, memory is globally managed within the context of the executing application programs, rather than suboptimized based on each and every virtual memory read or write operation.

An internal bus, here referred to as the Web, allows access to internal registers, counters and memory. The Web also includes an external interface to control instruction step and interrupt control for debugging and diagnostics.

The Tree Search Engine coprocessor provides memory range checking, illegal memory access notification and performs tree search instructions (such as memory read, write or read-add-write) operating in parallel with protocol processor execution.

The Dispatcher controls the passing of frames to the ten protocol processors and manages interrupts and timers.

The Completion Unit guarantees frame order from the processor complex to target port queues. A rich instruction set includes conditional execution, packing (for input hash keys), conditional branching, signed and unsigned operations, counts of leading zeros and more.

The Classifier Hardware Assist engine passes each frame's protocol header(s) and provides this information with frames as they are dispatched to the protocol processors.

The Control memory Arbiter controls processor access to both internal and external memory.

Egress frames may be stored in either one External Data Buffer (e.g. DS0) or two External Data Buffers (DS0 and DS1). Each Buffer can be comprised of a pair of 2 M×16 bit×4 bank DDR DRAM (storing up to 256K 64-byte frames) or a pair of 4 M×16 bit×4 bank DDR DRAM (storing up to 512K 64-byte frames). Choose the single External Data Buffer (e.g. DS0) for 2.28 Mbps or add the second Buffer (e.g. DS1) to support 4.57 Mbps Layer 2 and Layer 3 switching. Adding the second Buffer improves performance, but it does not increase frame capacity. The External Data Buffer interface runs at a 133 MHz clock rate with a 266 MHz data strobe and supports configurable CAS latency and drive strength.

Port mirroring allows one receive port and one transmit port to be copied to a system designated observation port without using protocol processor resources. Mirrored Interface device ports are configured to add frame and switch control data. A separate data path allows direct frame enqueuing to the Ingress Switch interface.

In the drawings and specifications there has been set forth a preferred embodiment of the invention and, although specific terms are used, the description thus given uses terminology in a generic and descriptive sense only and not for purposes of limitation.

What is claimed is:

1. A single computer system comprising:
   a central processing unit;
   a plurality of peripheral devices operatively associated with said central processing unit within said single computer system and comprising volatile memory, non-volatile memory, and a plurality of I/O subsystems to and from which data flows are exchanged with said central processor for processing of data by said central processing unit; and
   a network processor operatively interposed between said central processing unit and said peripheral devices and among said peripheral devices, said network processor having
   a plurality of interface processors;

instruction memory storing instructions accessibly to said interface processors;

data memory storing accessibly to said interface processors data passing through said network processor from and to said peripheral devices; and a plurality of input/output ports exchanging data passing through said network processor with said peripheral devices;

said network processor cooperating with said central processing unit in directing the exchange of data between said input/output ports and the flow of data through said data memory to and from said volatile memory and said non-volatile memory in response to execution by said interface processors of instructions loaded into said instruction memory.

2. Apparatus according to claim 1 wherein said network processor comprises a semiconductor substrate and further wherein said interface processors, said instruction memory, said data memory and said input/output ports are formed on said semiconductor substrate.

3. Apparatus according to claim 1 wherein the number of said interface processors exceeds four.

4. Apparatus according to claim 1 wherein one of said input/output ports is operatively connected with each corresponding one of said plurality of I/O subsystems.

* * * * *